United States Patent [19]

Heimberg

[11] 4,409,355
[45] Oct. 11, 1983

[54] PROCESS FOR PREPARING HIGH SOLIDS COPOLYMER LATICES WITH LOW VISCOSITY

[75] Inventor: Manfred Heimberg, Cincinnati, Ohio

[73] Assignee: National Distillers and Chemical Corporation, New York, N.Y.

[21] Appl. No.: 344,234

[22] Filed: Jan. 29, 1982

Related U.S. Application Data

[63] Continuation-in-part of Ser. No. 294,021, Aug. 18, 1981, which is a continuation of Ser. No. 128,603, Mar. 10, 1980, abandoned.

[51] Int. Cl.$^3$ .................... C08L 33/08; C08L 33/10
[52] U.S. Cl. ............................ 524/458; 524/533; 526/80; 526/87
[58] Field of Search ............ 524/458, 533; 523/201; 526/79, 80, 87

[56] References Cited

U.S. PATENT DOCUMENTS

| | | | |
|---|---|---|---|
| 2,496,384 | 2/1950 | Johannes de Nie | 260/86.3 |
| 2,520,959 | 9/1950 | Powers | 260/92.8 |
| 3,248,356 | 4/1966 | Snyder | 260/29.6 |
| 3,394,114 | 7/1968 | Anderson | 260/87.3 |
| 3,404,114 | 10/1968 | Snyder | 260/29.6 |
| 3,423,353 | 1/1969 | Levine et al. | 260/29.6 |
| 3,455,887 | 7/1969 | Murray | 260/78.5 |
| 3,483,171 | 12/1969 | Bauer et al. | 260/80.6 |
| 3,485,808 | 12/1969 | Wiesner | 260/85.5 |
| 3,547,857 | 12/1970 | Murray | 260/29.6 |
| 3,562,229 | 2/1971 | Bauer et al. | 260/80.81 |
| 3,804,881 | 4/1974 | Bassett et al. | 260/470 |
| 4,039,500 | 8/1974 | Bassett et al. | 526/80 |
| 4,247,434 | 1/1981 | Lovelace | 524/458 |

FOREIGN PATENT DOCUMENTS

| | | |
|---|---|---|
| 1133867 | 11/1968 | United Kingdom . |
| 1178016 | 1/1970 | United Kingdom . |
| 1191649 | 5/1970 | United Kingdom . |
| 1363432 | 8/1974 | United Kingdom . |
| 1450599 | 9/1976 | United Kingdom . |

OTHER PUBLICATIONS

VV 10 Vinyl Monomer product brochure of Shell Chemical Company 1966.

*Primary Examiner*—Paul R. Michl
*Attorney, Agent, or Firm*—Kenneth D. Tremain

[57] ABSTRACT

A process is disclosed for preparing copolymer latices possessing a solids content of at least about 60 weight percent and a viscosity not exceeding 15,000 cp. Brookfield Viscosity (RVF, Spindle No. 4) at 2 rpm from (a) vinyl acetate in an amount representing from about 10 weight percent to about 95 weight percent of total monomer charge, and (b) at least one monomer selected from the group consisting of acrylate ester, methacrylate ester and vinyl ester of an alpha-branched saturated monocarboxylic acid representing the balance of the total monomer charge. The aforesaid latices are prepared by polymerizing in a single reaction stage at least 10 weight percent of the total vinyl acetate monomer (a) and from 0 to about 50 weight percent of the total acrylate ester, methacrylate ester and/or vinyl ester of alpha-branched saturated monocarboxylic acid monomer (b) in an aqueous emulsion reaction medium containing a polymerization catalyst, and thereafter polymerizing in said reactor in a second stage the remaining portion of the total vinyl acetate monomer (a) together with the remaining portion of the acrylate ester, methacrylate ester, and/or vinyl ester of alpha-branched saturated carboxylic acid monomer (b) in the reaction medium containing additional catalyst if needed, polymerization being continued substantially to completion.

14 Claims, No Drawings

PROCESS FOR PREPARING HIGH SOLIDS COPOLYMER LATICES WITH LOW VISCOSITY

CROSS REFERENCE TO RELATED APPLICATIONS

This application is a continuation-in-part of commonly assigned copending U.S. patent application Ser. No. 294,021 filed Aug. 18, 1981, which is a continuation of commonly assigned U.S. patent application No. 128,603, filed Mar. 10, 1980, now abandoned.

BACKGROUND OF THE INVENTION

1. Field of the Invention

This invention relates to the field of copolymer latices and, more particularly, to such latices having high solids content and low viscosity and being prepared from a mixture of copolymerizable monomers including vinyl acetate and an acrylate ester, methacrylate ester and/or vinyl ester of an alpha-branched saturated monocarboxylic acid.

2. Description of the Prior Art

Numerous procedures for the emulsion polymerization and copolymerization of various ethylenically unsaturated monomers, vinyl esters, acrylate esters and methacrylate esters among them, have been known for some time. In general, a latex derived from a vinyl ester and one or more other monomers copolymerizable therewith is prepared by first charging an aqueous phase containing water, surface active agent, buffer, catalyst or catalyst system of the free radical type and usually a protective colloid such as polyvinyl alcohol (PVA), to a reactor. The monomers are thereafter charged to the reactor either as separate streams with mixing occurring in the reactor or in admixture, and either all at once or incrementally, and following heating to polymerization temperature, polymerization is thereafter permitted to proceed, accompanied by constant agitation, substantially to completion. The resulting latex is cooled and filtered and can be used in many applications, e.g., as paints and other surface coating compositions, adhesives and textile treating agents.

Emulsion polymerization procedures featuring one or more aspects of the aforedescribed method of preparing copolymer latices are described in U.S. Pat. Nos. 2,496,384; 2,520,959; 3,248,356; 3,404,114; 3,423,353; 3,455,887; 3,483,171; 3,485,808; 3,547,857; 3,562,229; 3,804,881; and 4,039,500. Similar emulsion polymerization processes are described in Great Britain Pat. Nos. 1,133,867; 1,178,016; 1,191,649; 1,363,432; and 1,450,599. U.S. Pat. No. 3,423,353 to Levine, et al. in particular describes latices obtained from vinyl acetate and one or more other comonomers including alkyl acrylates and methacrylates such as methyl acrylate, ethyl acrylate, propyl acrylate, butyl acrylate, isobutyl acrylate, 2-ethylhexyl acrylate, methyl methacrylate, ethyl methacrylate and n-propyl methacrylate, the latices being said to possess higher solids contents than obtainable using conventional emulsion polymerization techniques, while at the same time having reduced viscosities and improved freeze-thaw satbility. The latices are prepared in the conventional manner and once polymerization is substantially complete, a relatively large amount of water-soluble polymerization catalyst or intiator is added to the emulsion to reduce viscosity and increase particle size. It is speculated by patentees that this post-addition of catalyst results in some degradation of the surface active agent and the ether linkage-containing protective colloid when used, reducing their molecular weights by an oxidative mechanism which involves repture of the ether linkages. This oxidative degradation is thought to reduce the effectiveness of the surface active agent and protective colloid resulting in some agglomeration or particles. The larger average particle size of the emulsion is believed to be also responsible for the reduction in viscosity.

SUMMARY OF THE INVENTION

It has now been discovered that latices derived from vinyl acetate and acrylate ester, methacrylate ester and/or vinyl ester of an alpha-branched saturated monocarboxylic acid as hereinafter defined having high solids contents and low viscosity can be readily and conveniently prepared by controlling conditions of the polymerization thus dispensing with the need for further manipulative steps such as the post-addition of relatively large quantities of catalyst as in U.S. Pat. No. 3,423,353 to Levine et al, supra.

The post-addition of catalyst to latices prepared by the process of this invention has no significant effect on the viscosities of the products, demonstrating that the viscosities of the latices herein are for the most part fixed during polymerization.

In accordance with the present invention, copolymer latices possessing a solids content of at least about 60 weight percent and a viscosity not exceeding about 15,000 cp. Brookfield Viscosity (RVF, Spindle No. 4) at 2 rpm from (a) vinyl acetate in an amount representing from about 10 weight percent to about 95 weight percent of total monomer charge, and (b) at least one monomer selected from the group consisting of acrylate ester, methacrylate ester and vinyl ester of an alpha-branched saturated monocarboxylic acid representing the balance of the total monomer charge are prepared by the process which comprises polymerizing in a single reaction stage at least 10 weight percent of the total vinyl acetate monomer (a) and from 0 to about 50 weight percent of the total acrylate ester, methacrylate ester and/or vinyl ester of alpha-branched saturated monocarboxylic acid monomer (b) in an aqueous emulsion reaction medium containing a polymerization catalyst, and thereafter polymerizing in said reactor in a second stage the remaining portion of the total vinyl acetate monomer (a) together with the remaining portion of the acrylate ester, methacrylate ester, and/or vinyl ester of alpha-branched saturated carboxylic acid monomer (b) in the reaction medium containing additional catalyst if needed, polymerization being continued substantially to completion. Preferably during the first stage, the ratio of vinyl acetate monomer (a) to vinyl ester monomer (b) is greater than about 4.5 until about 40–60% of the total monomer charge is added and during the second addition, the ratio of vinyl acetate monomer (a) to vinyl ester monomer (b) is less than about 4.5 until the total remaining amount of monomers has been added to the polymerization reactor. One or more other ethylenically unsaturated monomers copolymerizable with monomers (a) and (b) present in an amount of up to 5 weight percent of the total monomer charge can be added at the commencement of or during the polymerization sequence.

The process herein contemplates the use of known and conventional surface active agents, buffers, protective colloids, catalysts, and the like, in the usual amounts, and can be carried out in equipment heretofore employed for emulsion polymerization.

Typically, the latices produced in accordance with this invention will possess a solids content from about 60 to about 70 weight percent and even higher. The viscosities of the high solids latices herein are generally but a fraction of the viscosities of latices prepared in the usual manner, i.e., by simultaneous addition of monomers, and will usually not exceed about 15,000 cp. Brookfield viscosity (RVF, Spindle No. 4) at 2 rpm. Viscosities of latices of equivalent high solids which are prepared in the conventional manner typically attain 50,000 cp. Brookfield viscosity (RVF, Spindle No. 5) at 2 rpm. The combination of high solids content and low viscosity makes the latices of this invention especially useful for formulation as paints and other surface coatings and as low pressure-sensitive adhesives.

DESCRIPTION OF THE PREFERRED EMBODIMENTS

The latices prepared in accordance with the process of this invention contain copolymers of at least one vinyl ester and at least one acrylate ester, methacrylate ester and/or vinyl ester of an alpha-branched saturated monocarboxylic acid. Generally, when preparing these copolymers, from about 10 weight percent to about 95 weight percent, and preferably from about 30 weight percent to about 85 weight percent, of vinyl acetate based on the total weight of monomers will be copolymerized with acrylate ester, methacrylate ester, and/or vinyl ester of alpha-branched saturated monocarboxylic acid.

Illustrative of acrylate esters and methylacrylate esters which can be used in this invention to good effect are methyl acrylate, ethyl acrylate, propyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, cyclohexyl acrylate, phenyl acrylate, methyl methacrylate, ethyl methacrylate, n-propyl methacrylate, n-amyl methacrylate, iosamyl methacrylate, hexyl methacrylate, 2-ethylbutyl methacrylate, octyl methacrylate, 3,5,5-trimethylhexyl methacrylate, decyl methacrylate, cyclohexyl methacrylate, norbornenyl methacrylate, benzyl methacrylate, phenyl methacrylate, and neopentyl methacrylate. Butyl acrylate and 2-ethylhexyl acrylate have been found to be especially advantageous for use herein.

Vinyl esters of alpha-branched monocarboxylic acids which are suitable for copolymerization with vinyl acetate in accordance with this invention are disclosed in U.S. Pat. Nos. 3,394,114, and 3,455,887, the contents of which are incorporated by reference herein. Such esters can be represented by the formula

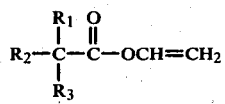

wherein $R_1$ and $R_2$ each represent the same or different alkyl radicals of mormal, branched or cyclic structure and $R_1$ represents hydrogen or an alkyl radical. Advantageously, the sum of the carbon atoms present in $R_1$, $R_2$ and $R_3$ does not exceed about 30. Examples of $R_1$, $R_2$ and $R_3$ are methyl, ethyl, propyl, butyl, pentyl, octyl, decyl, etc. Suitable acids are those prepared by the reaction of formic acid, or of carbon monoxide with water, with monoolefins in the presence of liquid highly acidic inorganic catalysts, such as sulfuric acid, phosphoric acid, boron trifluoride and water complexes of phosphoric acid, complexes of sulfuric acid, etc., such as described, for example, in U.S. Pat. Nos. 3,047,622; 3,059,004; 3,059,005; 3,059,006; and 3,059,007, the contents of which are incoporated by reference herein. The acids prepared by these methods are mixtures of alpha, alpha-dialkyl saturated monocarboxylic acids of the same number of carbon atoms and of the general formula set forth above. Very suitable acids are those prepared from monoolefinic hydrocarbons such as propylene, butylene-1, butylene-2, isobutylene, penetenes, hexenes, heptenes, octenes, etc. and polymers and copolymers of alkenes such as di-isobutylene, propylene trimer, propylene tetramer, etc. under conditions as set forth in the above mentioned patents. Such acids may also be prepared from mixtures of olefins obtained, for example, by cracking paraffins. The vinyl esters of the alpha-branched monocarboxylic acids may be prepared by known methods such as by reaction of the acid or acid mixture with vinyl acetate in the presence of a mercury salt or by the reaction of the acid with acetylene in the presence of metallic catalysts such as zinc, cadmium or mercury compounds. Such methods are known to those skilled in the art. A commercially available mixture of esters of the aforedescribed type, namely, VV 10 Vinyl Monomer, is described in a product brochure of the Shell Chemical Company, the contents of which are incorporated by reference herein.

Up to 5 weight percent of the total weight of the foregoing monomers can be interpolymerized with one or more additional monomers illustrative of which are the following: carbon monoxide, sulfur dioxide, ethylene, propylene, 1-butene, 2-butene, isobutylene, 1-pentene, 2-methyl-2-butene, 1-hexene, 4-methyl-1-pentene, 3,3-dimethyl-1-butene, 2,4,4-trimethyl-1-pentene, 6-ethyl-1-hexene, 1-heptene, 1-octene, 1-decene, 1-dodecene, allene, butadiene, isoprene, chloroprene, 1,5-hexadiene, 1,2,5-hexatriene, divinylacetylene, cyclopentadiene, dicyclopentadiene, norbornene, norbornadiene, methylnorbornene, cyclohexene, styrene, alpha-chlorostyrene, alphamethylstyrene, allylbbenzene, phenylacetylene, 1-phenyl-1, 3-butadiene, vinylnaphthalene, 4-methylstyrene, 2,4-dimethylstyrene, 3-ethylstyrene, 2,5-diethylstyrene, 2-methoxystyrene, 4-methoxy-3-methylstyrene, 4-chlorostyrene, 3,4-dimethyl-alpha-methylstyrene, 3-bromo-4-methyl-alpha-methylstyrene, 2,5-dichlorostyrene, 4-fluorostyrene, 3-iodostyrene, 4-cyanostyrene, 4-vinylbenzoic acid, 4-acetoxystyrene, 4-vinyl benzyl alcohol, 3-hydroxystyrene, 1,4-dihydroxystyrene, 3-nitrostyrene, 2-aminostyrene, 4-N,N-dimethylaminostyrene, 4-phenylstyrene, 4-chloro-1-vinylnaphthalene, acrylic acid, methacrylic acid, acrolein, methacrolein, acrylonitrile, methacrylonitrile, acrylamide, methacrylamide, N-methyl methacrylamide, chloroacrylic acid, methyl chloroacrylic acid, chloroacrylonitrile, ethacrylonitrile, N-phenyl acrylamide, N,N-diethylacrylamide, N-cyclohexyl acrylamide vinyl chloride, vinylidene chloride, vinylidene cyanide, vinyl fluoride, vinylidene fluoride, trichloroethene, methyl vinyl ketone, methyl isopropenyl ketone, phenyl ketone, methyl alpha-chlorovinyl ketone, ethyl vinyl ketone, divinyl ketone, hydroxymethyl vinyl ketone, chloromethyl vinyl ketone, allilydene diacetate, methyl vinyl ether, isopropyl vinyl ether, butyl vinyl ether, 2-ethylhexyl vinyl ether, 2-methoxyethyl vinyl ether, 2-chloroethyl vinyl ether, methoxyethoxy ether vinyl ether, hydroxyethyl vinyl ether, aminoethyl vinyl ether, alpha-methylvinyl methyl ether, divinyl ether, divinyl ether of ethylene glycol or diethylene glycol or triethanolamine, cyclohexyl vinyl ether, benzyl vinyl ether, phenethyl vinyl ether, cresyl vinyl ether, hydroxyphenyl vinyl ether, chlorophenyl vinyl ether, naphthyl vinyl ether, dimethyl maleate, diethyl maleate, di-(2-ethylhexyl) maleate, maleic anhydride, demethyl fumarate, dipropyl fumarate, vinyl ethyl sulfide, divinyl sulfide, vinyltolyl sulfide, divinyl sulfone, vinyl ethyl sulfone, vinyl ethyl sulfoxide, vinyl sulfonic acid, sodium vinyl sulfonate, vinyl sulfonamide, vinyl benzamide, vinyl pyridine, N-vinyl pyrollidone, N-vinyl carbazole, N-(vinyl benzyl)-pyrrolidine, N-(vinyl benzyl)-pyrrolidine, N-(vinyl benzyl)piperidine, 1-vinyl pyrene, 2-isopropenyl furan, 2-vinyl dibenzofuran, 2-methyl-5-vinyl pyridine, 3-isopropenyl pyridine, 2-vinyl piperidine, 2-vinyl quinoline, 2-vinyl benzoxazole, 4-methyl-5-vinyl thiazole, vinyl thiophene, 2-isopropenyl thiophene, indene, coumarone, 1-chloroethyl vinyl sulfide, vinyl 2-ethoxyethyl sulfide, vinyl phenyl sulfide, vinyl 2-naphthyl sulfide, allyl mercaptans, divinyl sulfoxide, vinyl phenyl sulfoxide, vinyl chlorophenyl sulfoxide, methyl vinyl sulfonate, vinyl sulfoanilide, and the like. Part or all of these optional monomers can be charged to the reactor at the commencement of or during the polymerization sequence. In some instances, these monomers may be used at a concentration below about two weight percent to avoid undue coagulation.

The surface active agents contemplated by this invention include any of the known and conventional surface active and emulsifying agents, principally the nonionic and anionic materials, and mixtures thereof heretofore employed in the emulsion copolymerization of vinyl acetate and ethylene, the nonionic surfactants being especially preferred. Among the nonionic surface active agents which have been found to provide good results are included the "Igepals" (G.A.F.), the "Tweens" (Atlas Chemical) and the "Pluronics" (BASF Wyandotte). The "Igepals" are members of a homologous series of alkylphenoxypoly (ethyleneoxy) ethanols which can be represented by the general formula

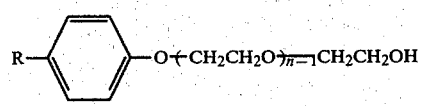

wherein R represents an alkyl radical and n represents the number of mols of ethylene oxide employed, among which are alkylphenoxypoly (ethyleneoxy) ethanols having alkyl groups containing from about 7 to about 18 carbon atoms, inclusive, and having from about 4 to about 100 ethyleneoxy units, such as the heptylphenoxypoly (ethylenoxy) ethanols, nonylphenoxypoly (ethyleneoxy) ethanols and dodecylphenoxypoly (ethyleneoxy) ethanols; the sodium or ammonium salts of the sulfate esters of these alkylphenoxypoly (ethyleneoxy) ethanols, alkylpoly (ethyleneoxy) ethanols; alkylpoly(propyleneoxy) ethanols; octylphenoxyethoxyethyldimethylbenzylammonium chloride; and polyethylene glycol t-dodecylthioether. The "Tweens" are polyoxyalkylene derivatives of fatty acid partial esters of sorbitol anhydride such as the polyoxyalkylene derivatives of sorbitan monolaurate, sorbitan monopalmitate, sorbitan monostearate, sorbitan tristearate, sorbitan monooleate and sorbitan trioleate. The "Pluronics" are condensates of ethylene oxide with a hydrophobic base formed by condensing propylene oxide with propylene glycol, and the like. Other suitable nonionic surfactants which can be employed herein are ethylene oxide derivatives of long chain fatty alcohols such as octyl, dodecyl, lauryl or cetyl alcohol. Anionic surface active agents which can be used herein include the alkali metal sulfates of $C_{12}$ to $C_{14}$ alcohols such as sodium lauryl sulfate and alkali metal salts of alkyl benzene sulfonic acids and alkyl toluene sulfonic acids having aliphatic side chains of about 10 to about 15 carbon atoms, and the like. The surface active agent is generally employed at from about 3% to about 5% and preferably, at from about 3.5% to about 4.5%, by weight of the total monomers present.

A protective colloid is generally incorporated in the aqueous emulsions of this invention. Such known and conventional protective colloids as: the partially and fully hydrolyzed polyvinyl alchols; cellulose ethers, e.g., hydroxymethyl cellulose, hydroxyethyl cellulose, ethyl hydroxylethyl cellulose and ethoxylated starch derivatives; the natural and synthetic gums, e.g. gum tragacanth and gum arabic; polyacrylic acid, poly (methyl vinyl ether/maleic anhydride) and polyvinyl pyrrolidone, are well suited for use herein, preferably at a level of from about 0.1% to about 2% by weight of the emulsion. Polyvinylpyrrolidone and the partially hydrolyzed polyvinyl alcohols are especially advantageous for use in this invention.

The catalysts used in the copolymerization reaction are any of the known and conventional free radical polymerization catalysts heretofore used for the preparation of copolymer latices and include inorganic peroxides such as hydrogen peroxide, sodium perchlorate and sodium perborate, inorganic persulfates such as sodium persulfate, potassium persulfate and ammonium persulfate and reducing agents such as sodium hydrogen sulfite. Catalyst (including co-catalyst reducing agent, if employed) is generally utilized at a level of from about 0.1% to about 1% by weight of total comonomers. The catalyst can be added to the reaction medium all at once or it can be divided into two or more parts and added to the reactor medium with each addition of monomer or during either or both polymerization sequences.

An alkaline buffering agent such as sodium bicarbonate, ammonium bicarbonate, sodium acetate, and the like, may be added to the aqueous system to maintain the pH at the desired level. The amount of buffer is generally about 0.01 to 0.5% by weight based on the monomers.

The method by which the monomers are charged to the reactor is not critical. The monomers can be added to the reaction medium as a steady stream, drop-wise or in periodic increments; vinyl acetate and comonomeric ester can be admixed prior to being charged to the reactor or these monomers can be introduced to the reactor as separate streams. Advantageously, the monomers are added as a steady stream over periods ranging from about 1 hour to about 5 hours and preferably, over a period of from about 2 hours to about 3 hours.

The temperature reaction herein can be selected at levels which have heretofore been employed in emulsion polymerization. For both polymerization sequences, the temperature can range from about 0° C. to about 100° C., preferably from about ambient temperature to about 80° C., with the reaction medium being constantly stirred or otherwise agitated. The substantial completion of polymerization is usually indicated when free monomer content of the latex emulsion is below about 1% and preferably below about 0.5%.

In the examples which follow, in which conventional equipment was used and weight parts are given, examples 1 to 11 are illustrative of the copolymer latices and emulsion polymerization process of this invention while comparative examples 1A and 1B are given by way of illustrating the prior art latices and polymerization procedures. Components of the emulsion media employed in the examples are identified as follows:

| COMPONENT | SOURCE | COMPOSITION |
|---|---|---|
| Triton X-405 | Rohm and Haas Company | Octylphenoxy polyethoxy ethanol |
| Triton QS-9 | Rohm and Haas Company | Phosphate ester, acid form |
| Tamol 850 | Rohm and Haas Company | Sodium salt of polymeric carboxylic acid |
| Sipon ESY | Alcolac, Inc. | Sodium lauryl ether sulfate |
| Monomer X-980 | Rohm and Haas Company | Trimethylol propane trimethacrylate Sodium lauryl sulfate |
| Butyl Carbitol | Union Carbide Corporation | Diethylene glycol monobutyl ether |
| Plasticizer Surfactant Natrosol 25OMR | Cincinnati Milacron Chemicals, Inc. Hercules, Inc. | Hydroxyethyl-cellulose |
| Trycol OP-407 | Emery Industries | Octyl phenol condensed with an average of 40 units of ethylene oxide |
| Trycol NP-507 | Emery Industries | 70% aqueous solution of nonyl phenol condensed with an average of 50 units of ethylene oxide |
| Trycol NP-4 | Emery Industries | 100% POE(4) nonyl phenol |
| CMP Acetate | Troy Chemical Corporation | Preservative preparation containing 10% by weight of chloro-methoxypropylmer-curic acetate |
| Alipal CO-433 | GAF Corporation | 20% aqueous sodium salt of a sulfate ester of an alkyl-phenoxypoly (ethyleneoxy) ethanol |
| Igepal CO-430 | GAF Corporation | 100% Nonylphenoxy-poly (ethyleneoxy) ethanol |
| Igepal CO 977 | GAF Corporation | 70% Aqueous solution of nonylphen-oxypoly (ethylene-oxy ethanol |
| VV10 | Shell Chemical Company | Mixture of vinyl esters of saturated tertiary carboxylic acid of 10 carbon atoms. |

EXAMPLE 1

To a 2000 ml resin flask equipped with stirrer, reflux condenser, addition funnel and thermometer were added the following solutions:

| (a) | Deionized water | 200 parts |
|---|---|---|
| (b) | Polyvinylpyrrolidone | 2.5 parts |
| | Deionized water | 220 parts |
| | TRITON X-405 | 40 parts |
| | TRITON QS-9 | 12.5 parts |
| | Sodium hydroxide | to pH 10 | followed by 40 parts of vinyl acetate. The reactor was heated with a water bath and at 60° C., 1.65 parts of ammonium persulfate in 10 parts of water were added all at once. At 72° C., the addition of 320 parts of vinyl acetate was started and then continued at 78°–80° C., over about 65 minutes. Thereafter, a mixture of 360 parts of vinyl acetate and 150 parts of butyl acrylate was added over about 120 minutes. When all the monomer mixture had been added, 0.2 part of ammonium persulfate was introduced and the batch was given an additional 30 minutes at 80° C. to completely consume the monomers. Cooled to room temperature, the copolymer latex had a 65.2 percent solids content and a Brookfield Viscosity (RVF, Spindle No. 2) of 2700 cp at 2 rpm and 800 cp at 20 rpm.

COMPARATIVE EXAMPLE 1A

In this example, which is illustrative of the prior art, a single stage addition of monomers was used. The protective colloid was omitted in order to avoid unmanageable viscosity for the completed latex.

To a 2000 ml resin flask equipped as in Example 1 were added:

| Deionized water | 450 parts |
|---|---|
| TRITON X-405 | 37 parts |
| TRITON QS-9 | 25 parts |
| Sodium hydroxide | to pH 10 |

The solution was brought to 70° C. with a controlled temperature water bath and 1.65 parts of ammonium persulfate in 10 parts of water were added all at once, followed by a mixture of 720 parts of vinyl acetate and 150 parts of butyl acrylate monomers added over about 140 minutes. The reaction temperature rapidly rose to, and was controlled at, 80° C. during addition of the monomers. Following the monomer addition, 0.3 part of ammonium persulfate in 10 parts of water additionally was added. The reaction temperature was held at 80° C. for another hour and then the batch was cooled to room temperature. The copolymer latex had 64.6 percent solids content and Brookfield viscosity (RVF, Spindle No. 5) of 50,000 cp at 2 rpm and 12,100 cp at 20 rpm. This viscosity was altogether too high for a good latex paint formulation.

COMPARATIVE EXAMPLE 1B

This example is also illustrative of the prior art procedure of copolymerizing all of the monomers simultaneously. The following recipe was prepared and added to a resin flask equipped as in Example 1:

| | gm |
|---|---|
| Vinyl acetate | 718 |
| Butyl acrylate | 147 |
| Deionized water | 470 |
| Triton X-405 | 37 |
| Triton QS-9 | 25 |
| NaOH | 2.5 |

-continued

|  | gm |
|---|---|
| (NH4)2S2O8 | 1.65 + 0.3 |

The surface active agents were dissolved in the water and the solution's pH was adjusted to 11.6 with the NaOH (dissolved in $H_2O$). The solution was charged to the reactor, heated to 70° C. At this point the first part of the $(NH_4)_2S_2O_8$ was added and the addition of the monomer blend commenced. The addition rate was fast during the first 2 hours of polymerization (approximately 80% of the monomer was added during this period). During the last half hour the monomer addition rate was lowered (with the latex becoming fairly viscous). Upon completion of the monomer addition, the second part of the catalyst was added (dissolved in 500 ml $H_2O$). Afterwards, the batch was kept at about 80° C. for about 1 hour. The polymerization temperature was 80° C.±1° C. The resulting latex had a good appearance but very viscous; it did not contain any gel but it contained numerous air bubbles. The following properties of the latex were observed:
Solids: 64.6%
Brookfield Viscosity (Spindle No. 5)

| r.p.m. | 2 | 4 | 10 | 20 |
|---|---|---|---|---|
| reading | 25 | 32.5 | 46 | 60.5 |
| factor | 2000 | 1000 | 400 | 200 |
| cp | 50000 | 32500 | 13400 | 12100 |

The drawdown on a glass plate was clear but contained many bubbles.

While the latex of Example 1 is an excellent candidate for use in paints, it is readily apparent that the latices produced in accordance with the prior art procedure of simultaneous copolymerization are not suitable materials for surface coating formulations.

EXAMPLE 2

To the resin flask reactor of Example 1 were added:

| Deionized water | 420 parts |
|---|---|
| TRITON X-405 | 40 parts |
| SIPON ESY | 20 parts |
| Polyvinylpyrrolidone | 5 parts |
| Sodium acetate | 3.2 parts |
| Vinyl acetate | 40 parts |
| Ammonium persulfate | 1.65 parts in |
| Water | 10 parts |

At 72° C., the addition of 320 parts of vinyl acetate was started, then continued at 78°-80° C. over about 65 minutes. Thereafter, a mixture of 360 parts of vinyl acetate and 150 parts of butyl acrylate was added over about 120 minutes. When all the monomer mixture had been added, 0.2 part of ammonium persulfate was introduced and the batch was held an additional 30 minutes at 80° C. to consume remaining monomers. When cooled to room temperature, the copolymer latex was found to have 64.8 percent solids and a Brookfield viscosity (RVF, Spindle No. 1) of 550 cp at 2 rpm and 280 cp at 20 rpm.

EXAMPLE 3

To the resin flask reactor of Example 1 were added:

| Deionized water | 335 parts |
|---|---|
| TRITON X-405 | 50 parts |
| SIPON ESY | 22 parts |
| Polyvinylpyrrolidone | 5 parts |
| Sodium acetate | 3.2 parts |
| Vinyl acetate | 40 parts |

After the addition of 60° C. of 1.65 parts of ammonium persulfate in 10 parts of water, 320 parts of vinyl acetate were added over 75 minutes at 78°-80° C. followed by a solution of 0.1 part of ammonium persulfate in 5 parts of water, then a mixture of 360 parts of vinyl acetate and 150 parts of butyl acrylate over 135 minutes.

To complete polymerization, 0.5 part of ammonium persulfate was intermittently added over the next hour. The latex batch, cooled to room temperature, contained 69.5 percent solids, and had a Brookfield viscosity (RVF, Spindle No. 2) of 1200 cp at 2 rpm and 570 cp at 20 rpm.

EXAMPLE 4

Example 2 was repeated except that 8.7 parts of acrylic acid were included in the second monomer addition; i.e., of vinyl acetate-butyl acrylate mixture. The latex contained 65.8 percent solids and had a Brookfield viscosity (RVF, Spindle No. 2) of 2600 cp at 2 rpm and 900 cp at 20 rpm.

EXAMPLE 5

To test the performance of the high solids latices of this invention, standard latex paints were prepared from the copolymer latices of Example 1 (Part A) and Example 2 (Part B). Using normal paint making procedures, a pigment grind was prepared and then let down with latex, water and thickener solution to arrive at suitable brushing viscosities. The viscosity of the Part A paint was 77 Krebs Units (K.U.) and that of the Part B paint was 84 Krebs Units (K.U.). Both paints were drawn down on a Leneta contrast chart, using a 6 mil drawdown bar. The dry drawdowns were examined and found to be quite satisfactory with no latex coagulation or pigment agglomeration present. Hiding power was considered to be entirely acceptable. Brushouts were made on compressed paperboard, both one and two coats, with an overnight dry between coats. Application of the two paints was accomplished without noting difficulties of any sort. Viscosities were checked after one month for shelf stability and found to be excellent. The Part A paint increased by only 2 K.U. and the Part B paint remained the same.

EXAMPLE 6

The following were added to a resin flask as in Example 1:

|  | gm |
|---|---|
| Vinyl acetate | 720 |
| Butyl acrylate | 150 |
| Deionized water | 455 |
| Triton X-405 | 40 |
| Sipon ESY | 20 |
| Polyvinylpyrrolidone | 5 |
| $NaO_2CCH_3$ | 3.2 |

-continued

| | gm |
|---|---|
| $(NH_4)_2S_2O_8$ | 165 + 0.1 + 0.2 |

The surface active agents, polyvinylpyrrolidone and buffer were dissolved in cold water. The solution plus 40 gm of vinyl acetate were charged to the reactor and heated. At 60° C., the first part of the catalyst was added and when the reaction temperature reached 72° C., the addition of the first stage of monomer (320 gm vinyl acetate) was started. During this addition (65 minutes) the polymerization temperature was kept between 76°–78° C. with cooling. Immediately after completing the addition of the first stage, the addition of the second stage (360 gm vinyl acetate admixed with 150 gm butyl acrylate) was started. The reaction temperature dropped, and light heating was necessary to keep the reaction temperature from falling. The rate of addition was somewhat low in order to prevent the build-up of free monomer in the reactor which might otherwise produce foam. Catalyst was added both when the addition had started and upon its completion. After completion of the monomer addition (160 minutes) the temperature rose to 84° C. The latex obtained had a good appearance. Very little grit remained on the filter after the latex had been screened.

The following properties of the latex were observed:
Solids: 64.8%
Brookfield Viscosity (Spindle No. 1)

| r.p.m. | 2 | 4 | 10 | 20 |
|---|---|---|---|---|
| reading | 11 | 185 | 35 | 56 |
| factor | 50 | 25 | 10 | 5 |
| cp | 550 | 462 | 360 | 280 |

Glass drawdown of the latex appeared very good; the latex was somewhat hazy but gel/bubble-free.

EXAMPLE 7

The following were added to a resin flask as in Example 1:

| | gm |
|---|---|
| Vinyl acetate | 740 |
| Butyl acrylate | 157 |
| Deionized water | 455 |
| Triton X-405 | 40 |
| Triton QS-9 | 12.5 |
| Polyvinylpyrrolidone | 3.5 |
| NaOH | 1.2 |
| $(NH_4)_2S_2O_8$ | 1.65 |

The polyvinylpyrrolidone/surface active agent solution was prepared and pH adjusted as in the previous examples. First stage addition to monomer (55 minutes) consisted of increments of 40 and 320 gm vinyl acetate. Second stage addition (140 minutes) consisted of a mixture of 380 gm vinyl acetate and 157 gm butyl acrylate. While the second stage of monomer was slightly increased to compensate for possible losses, the solids content indicated that this was not necessary. When the addition of the second stage was started, as usual the reaction temperature dropped. At this point 0.1 gm of extra catalyst was added, but without much result. The reaction temperature was then regulated by controling the monomer flow and bath temperature. At the beginning of the second stage, the temperature dropped to 75° C., but during the major part, it was between 78°–80° C. At the end of the monomer addition, 0.2 gm of $(NH_4)_2S_2O_8$ was added. The temperature rose to 83° C. No foam was observed. The latex contained the usual amount of grit, but once this grit was removed by filtration the product had an acceptable appearance. The following properties of the latex were observed:
Solids: 65.7%
Brookfield Viscosity (Spindle No. 2)

| r.p.m. | 2 | 4 | 10 | 20 |
|---|---|---|---|---|
| reading | 8 | 12 | 20 | 29 |
| factor | 200 | 100 | 40 | 20 |
| cp | 1600 | 1200 | 800 | 580 |

Glass drawdown of the latex gave a slight haze but the latex was nevertheless of good overall appearance.

EXAMPLE 8

The following interior paint formulations were prepared with the copolymer latices of Examples 6 and 7:

| | gm |
|---|---|
| Water | 516 |
| CMP Acetate | 1 |
| Ethylene Glycol | 96 |
| Butyl Carbitol | 68 |
| $K_2CO_3$ | 4 |
| Tamol 850 | 8 |
| Plasticizer Surfactant | 12 |
| 3% Natrosol 250 MR | 600 |
| $T_iO_2$ | 600 |
| Calcined Clay | 240 |
| Whitening (atomite) | 1000 |
| Total | 3145 |

| Paint | A | B |
|---|---|---|
| Pigment Grind | 394 | 394 |
| Latex of Example 6 | 80.5 | — |
| Latex of Example 7 | — | 80.5 |
| Water | 93 | 95 |
| 3% Natrosol 250 MR | 15 | 13 |
| Klebs Units (K.U.) | 84 | 77 |

Drawdowns of Paints A and B were made on Leneta contrast charts using a 6 mil drawdown bar. The paints were brushed on compressed paperboard, both one and two coats, with an overnight dry between coats. The paperboard panel was sealed with diluted latex of Example 6 before application of the paint. Both drawdowns and brushings were satisfactory. No coagulation of latex or pigment agglomeration occurred with either paint.

Viscosities:
  Paint A 84 K.U.
  Paint B 79 K.U.

EXAMPLE 9

The following were added to a resin flask as in Example 1:

| | gm |
|---|---|
| Vinyl acetate | 735 |
| Butyl acrylate | 150 |
| Deionized water | 360 |
| Triton X-405 | 50 |

-continued

|  | gm |
|---|---|
| Sipon ESY | 22 |
| Polyvinylpyrrolidone | 5 |
| NaO$_2$CCH$_3$ | 3.2 |
| (NH$_4$)$_2$S$_2$O$_8$ | 1.65 + 0.1 + 10.5 |

First stage addition of monomer (360 gm of vinyl acetate over 75 minutes) was completed and after about 130 cc of monomer mixture from the second stage addition (360 gm of vinyl acetate mixed with 150 gm butyl acrylate) remained to be added, the final addition of catalyst was started (0.5 gm ammonium sulfate in 20 cc H$_2$O). The resulting latex had a good appearance while containing the usual amount of grit which was readily removable by filtration or similar means. The following properties of the latex were observed:
Solids: 69.3–0.5%
Brookfield Viscosity (Spindle No. 2)

| r.p.m. | 2 | 4 | 10 | 20 |
|---|---|---|---|---|
| reading | 6 | 9.5 | 17.5 | 28.5 |
| factor | 200 | 100 | 40 | 20 |
| cp | 1200 | 950 | 700 | 570 |

Glass drawdown of the latex made several days after the product was made gave a very good gel and bubble free coating.

EXAMPLE 10

The following were added to a resin flask as in Example 2:

|  | gm |
|---|---|
| Vinyl acetate | 720 |
| Butyl acrylate | 150 |
| Acrylic acid | 8.7 |
| Deionized water | 435 |
| Triton X-405 | 40 |
| Sipon ESY | 20 |
| Polyvinylpyrrolidone | 5 |
| NaO$_2$CCH$_3$ | 3.2 |
| (NH$_4$)$_2$S$_2$O$_8$ | 1.65 + 0.2 |

The polymerization was started as in Example 6 but with 360 gm of vinyl acetate being added in the first stage (over 65 minutes) and 360 gm of vinyl acetate admixed with 150 gm butyl acrylate and 8.7 gm acrylic acid being added in the second stage (over 160 minutes). During the second stage, the addition rate and bath temperature were regulated so that reaction temperature was always close to the bath temperature (78°–80° C.). No catalyst addition was made at the start of the addition of the second stage. The final catalyst addition was started about 5 minutes after completion of the addition and extended over a period of about 15 minutes. After completion of the monomer addition, the reaction temperature for about 40 minutes was slightly above or equal to the bath temperature. Approximately 15 minutes after the reaction temperature had begun to decline, the contents of the reactor were cooled to room temperature. The resulting latex had no free monomer odor and had a good, nearly grit-free appearance. Screening of the monomer was very easily accomplished.

The following properties of the latex were observed:
Solids: 65.8%
Brookfield Viscosity (Spindle No. 2)

| rpm | 2 | 4 | 10 | 20 |
|---|---|---|---|---|
| reading | 13 | 19 | 31 | 45 |
| factor | 200 | 100 | 40 | 20 |
| cp | 2600 | 1900 | 1240 | 900 |

Glass drawdown of the latex gave a gel and bubble free coating of very good overall appearance.

EXAMPLE 11

This example results in a latex of high viscosity, polymerization being conducted in a sequence of two stages but with a mixture of vinyl acetate and butyl acrylate being polymerized at each stage of monomer addition. The following were added to a resin flask as in Example 1:

|  | gm |
|---|---|
| Vinyl acetate | 700 |
| Butyl acrylate | 150 |
| Monomer X-980 | 26 |
| Acrylic acid | 8.7 |
| Deionized water | 450 |
| Emersal 6400 | 20 |
| Trycol PO-407 | 40 |
| Polyvinylpyrrolidone | 2 |
| NaO$_2$CCH$_3$ | 4 |
| (NH$_4$)$_2$S$_2$O$_8$ | 16 |

To facilitate the dissolution of the Emersal 6400, some water was added to the surface active agent followed by heating.

The monomer mixtures were prepared as follows:

|  | Initial Stage | First Stage (gm) | Second Stage (gm) |
|---|---|---|---|
| Vinyl acetate | 40 | 310 | 350 |
| Butyl acrylate | 0 | 65 | 85 |
| Monomer X-980 | 0 | 13 | 13 |
| Acrylic acid | 0 | 4.35 | 4.35 |

First stage addition of monomer took place over 80 minutes and second stage addition of monomer was carried out over 85 minutes. No extra catalyst was added upon completion of the monomer additions. The resulting latex which contained the usual small amount of grit had a good appearance with just a trace of dilatancy.

The following properties of the latex were observed:
Solids: 65.2%
Brookfield Viscosity (Spindle No. 3)

| r.p.m. | 2 | 4 | 10 | 20 |
|---|---|---|---|---|
| reading | 16.5 | 21 | 30 | 39 |
| factor | 500 | 250 | 100 | 50 |
| cp | 8250 | 5250 | 3000 | 1950 |

Glass drawdown of this latex had good appearance with only a slight haze.

EXAMPLE 12

The following recipe was employed:

|  | gm |
|---|---|
| Vinyl acetate | 264 |

-continued

|  | gm |
|---|---|
| Butyl acrylate | 607 |
| Acrylic acid | 9 |
| Deionized water | 350 |
| Igepal CO-977 | 30 |
| Igepal CO-430 | 10 |
| Triton QS-9 | 20 |
| Polyvinylpyrrolidone | 3 |
| $NaO_2CCH_3$ | 3.2 |
| NaFS | 4.5 |
| $FeSO_4.7H_2O$ | 0.05 |
| $(NH_4)_2S_2O_8$ | 1 + 1.5 + 100 cc $H_2O$ (delayed) |

Following heating of the reactor and its contents to 70° C., 1 gm of $NH_4PS$ was added and the addition of the first stage of monomer, formed as follows, was started:

|  | gm |
|---|---|
| Vinyl acetate | 91 |
| Butyl acrylate | 240 |
| Acrylic acid | 45 |

The liquid in the reactor almost immediately became bluish indicating that the reaction had started.

The addition rate of the monomer blend was increased gradually. Some 5 minutes after beginning with the monomer addition, the addition of the catalyst solution was started. The addition of the first stage of monomer was completed in 2 hours, 10 minutes.

The second stage of monomer was formed as follows:

|  | gm |
|---|---|
| Vinyl acetate | 173 |
| Butyl acetate | 367 |
| Acrylic acid | 45 |

The addition was completed in 2½ hours. The reaction temperature was always below the bath temperature. At the beginning, the gap was 7°–8° C.; near the end it was about 4° C. The batch was kept running about 1 hour after completing the monomer addition, with continuous catalyst addition. The product latex which was somewhat viscous and contained some grit, possessed the following properties:
Solids: 63%
Viscosity: Brookfield (Spindle No. 4)

| r.p.m. | 2 | 4 | 10 | 20 |
|---|---|---|---|---|
| reading | 24 | 30 | 41 | 53 |
| factor | 1000 | 500 | 200 | 100 |
| C.P. | 24000 | 15000 | 8200 | 5300 |

The glass plate drawdown was clear the first day but later became somewhat hazy. The latex contained some gels and was tacky.

EXAMPLE 13

The following recipe was employed:

|  | gm |
|---|---|
| Vinyl acetate | 764 |
| Butyl acrylate | 608 |
| Acrylic acid | 10 |
| Deionized water | 350 |
| Igepal CO-970 | 20 |
| Igepal CO-430 | 20 |
| Triton QS-9 | 20 |
| Polyvinylpyrrolidone | 3 |
| $NaO_2CCH_3$ | 3.2 |
| NaFS | 4.5 |
| $FeSO_4.7H_2O$ | 0.05 |
| $(NH_4)_2S_2O_8$ + 25% aq. sol. | 100 cc |

The general procedure used was similar to that of the previous examples but with additions of 75% of the catalyst solution commencing upon the addition of the monomer.

The first stage of monomer addition was as follows:

|  | gm |
|---|---|
| Vinyl acetate | 79 |
| Butyl acrylate | 316 |
| Acrylic acrylate | 5 |

The second stage of monomer addition was as follows:

|  | gm |
|---|---|
| Vinyl acetate | 185 |
| Butyl acetate | 292 |
| Acrylic acid | 5 |

After the second stage of monomer addition, the reaction temperature was observed to drop together with an increase in reflux. Two hours later, the addition of the remaining 25 cc of catalyst solution was resumed. Addition of monomer was completed in 3 hours, 10 minutes. The resulting latex had some free monomer odor and contained small amounts of grit which were less than that of those of latices obtained in previous examples.
Solids: 64.6%
Viscosity: Brookfield (Spindle No. 3)

| r.p.m. | 2 | 4 | 10 | 20 |
|---|---|---|---|---|
| reading | 19 | 25 | 35 | 46 |
| factor | 500 | 250 | 100 | 50 |
| C.P. | 9500 | 6250 | 3500 | 2300 |

EXAMPLE 14

The following recipe was employed:

|  | gm |
|---|---|
| Vinyl acetate | 264 |
| 2 Ethylhexyl acrylate | 608 |
| Acrylic acid | 10 |
| Deionized water | 400 |
| Trycol NP-507 | 20 |
| Trycol NP-4 | 20 |
| Triton QS-9 | 20 |
| Polyvinylpyrrolidone | 3 |
| $NaO_2CCH_3$ | 3.2 |
| $(NH_4)_2S_2O_8$ | 1 + 1.5 (40 cc $H_2O$) |
| $FeSO_4.7H_2O$ | 0.05 |
| NaFS | 4.5 |

The base solution was prepared with 400 cc water and charged to the reactor (including the Fe++ and NaFS). The reactor was heated and at 54° C. and the first part of the ammonium persulfate was aggregated. Five minutes later, the addition of the first stage monomer was commenced as follows:

|  | gm |
|---|---|
| Vinyl acetate | 79 |
| 2-Ethylhexyacrylate | 316 |
| Acrylic acid | 5 |

After about 45 minutes the reaction temperature reached about 77° C. Monomer addition was completed in 2 hours. About 15 minutes before completing the monomer addition, the reaction temperature began to fall. At this point the addition of the second part of the (NH$_4$)$_2$S$_2$O$_8$ was started (1.5 gm + 40 cc H$_2$O). Second stage monomer addition was as follows:

|  | gm |
|---|---|
| Vinyl acetate | 185 |
| 2-Ethylhexyl acrylate | 292 |
| Acrylic acid | 5 |

The addition of monomer in the second stage of the polymerization was completed in 2 hours, 50 minutes. For most of the time, the bath temperature was between 1°-2° C. above the reaction temperature. Near the end of the reaction, the bath and reaction temperatures became about equal. Catalyst addition proceeded about 20 minutes after completing the addition of monomer. The resulting latex was easily screened and contained small amounts of grit.

Solids: 64.0-64.2%
Viscosity: Brookfield (Spindle No. 2)

| r.p.m. | 2 | 4 | 10 | 20 |
|---|---|---|---|---|
| reading | 8 | 14 | 33 | 64 |
| factor | 200 | 100 | 40 | 20 |
| C.P. | 1600 | 1400 | 1320 | 1280 |

The latex was not very thixotropic. The glass plate drawdown was clearer and more tacky than those prepared with butyl acrylate. Some gel was present.

EXAMPLE 15

The following recipe was employed:

|  | gm |
|---|---|
| Vinyl acetate | 654 |
| VV-10 | 218 |
| Acrylic acid | 87 |
| Deionized water | 450 |
| Trycol OP-407 | 40 |
| Alipal CO-443 | 20 |
| Polyvinylpyrrolidone | 3 |
| NaO$_2$CCH$_3$ | 3.2 |
| (NH$_4$)$_2$S$_2$O$_8$ | 1.5 + 0.4 |

The surface active agents, polyvinylpyrrolidone and buffer agent were dissolved in 400 cc of water. The solution was charged to the reactor. The reactor content was heated and at about 55° C. 40 gm of vinyl acetate was added to the reactor. At 62° C., 15 gm of (NH$_4$)$_2$S$_2$O$_8$ was added to reactor. The reaction temperature rose rapidly to 75° C. At this point the first stage monomer addition was made as follows:

|  | gm |
|---|---|
| Vinyl acetate | 287 |
| VV-10 | 95 |

The first stage was completed in 60 minutes. Reactivity was very good throughout addition of the addition.

0.5 Gm of (NH$_4$)$_2$S$_2$O$_8$ was dissolved in 50 cc Water, and the solution was placed in a second separatory funnel. Second stage monomer was prepared as follows:

|  | gm |
|---|---|
| Vinyl acetate | 327 |
| VV-10 | 138 |
| Acrylic acid | 87 |

Upon completion of the first stage monomer addition, second stage monomer addition was started. The reaction temperature began to fall, consequently, the addition of the extra catalyst solution was commenced. After a few minutes the reaction became very vigourous and catalyst addition was terminated. To compensate for the lack of water loss, deionized water was added resulting in a reduction in reaction temperature. The bath temperature was increased and catalyst solution addition was resumed. After a few minutes, the reaction again became very vigourous, and it was necessary to cool the head of the reactor, making the temperature drop sharply. Again catalyst solution was added, and the cycle repeated. The addition of the second stage monomer was completed in 110 minutes. The addition of the catalyst solution was continued for another 10 minutes with a total of 40 cc being used. The resulting latex was readily filtered and contained only a very small amount of grit.

Solids: 65.3%
Viscosity: Brookfield (Spindle No. 2)

| r.p.m. | 2 | 4 | 10 | 20 |
|---|---|---|---|---|
| reading | 14 | 20 | 32 | 455 |
| factor | 200 | 100 | 40 | 20 |
| C.P. | 2800 | 2000 | 1280 | 910 |

The glass plate drawdown was slightly hazy and the surface had a somewhat rippled appearance. The latex was practically gel free.

What is claimed is:

1. A process for preparing copolymer latices possessing a solids content of at least about 60 weight percent and a viscosity not exceeding 15,000 cp. Brookfield Viscosity (RVF, Spindle No. 4) at 2 rpm from (a) vinyl acetate in an amount representing from about 10 weight percent to about 95 weight percent of total monomer charge, and (b) at least one monomer selected from the group consisting of acrylate ester, methacrylate ester, and vinyl ester of an alpha-branched saturated monocarboxylic acid representing the balance of the total monomer charge which comprises polymerizing in a single reaction stage at least 10 weight percent of the total vinyl acetate monomer (a) and from 0 to about 50 weight percent of the total acrylate ester, methyacrylate ester and/or vinyl ester of alpha-branched saturated monocarboxylic acid monomer (b) in an aqueous emulsion reaction medium containing a polymerization catalyst, and thereafter polymerizing in said reactor in a second stage the remaining portion of the total vinyl acetate monomer (a) together with the remaining portion of the acrylate ester, methacrylate ester, and/or vinyl ester of alpha-branched saturated carboxylic acid monomer (b) in the reaction medium containing additional catalyst if needed, polymerization being continued substantially to completion.

2. The process of claim 1 wherein at least 10 weight percent of the total vinyl acetate is polymerized in the first stage.

3. The process of claim 1 wherein at least 25 weight percent of the total vinyl acetate is polymerized in the first stage.

4. The process of claim 1 wherein the acrylate ester monomer is butyl acrylate and/or 2-ethylhexylacrylate 5. The process of claim 1 wherein the vinyl ester of alpha-branched monocarboxylic acid posesses the structural formula

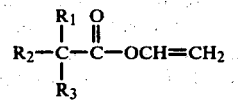

wherein $R_1$ and $R_2$ each represents the same or different alkyl radicals of normal, branched or cyclic structure and $R_3$ represents hydrogen or alkyl radical.

6. The process of claim 5 wherein the sum of the carbon atoms present in $R_1$, $R_2$ and $R_3$ does not exceed about 30.

7. The process of claim 5 wherein a mixture of such vinyl esters are employed in which $R_1$, $R_2$ and $R_3$ each is a saturated alkyl group.

8. The process of claim 1 in which one or more other ethylenically unsaturated monomers copolymerizable with monomers (a) and (b) present in an amount of up to 5 weight percent of the total monomer charge is added at the commencement of, or during, polymerization.

9. The process of claim 1 in which the vinyl acetate monomer (a) is present in an amount representing from about 30 weight percent to about 85 weight percent of the total monomer charge.

10. The process of claim 1 in which less than about 60 weight percent of the total vinyl acetate monomer present is initially added to the reaction medium with the balance thereof being sequentially added to the reaction medium with monomer (b).

11. The process of claim 1 in which the surface active agent is at least one member of the group consisting of nonionic and anionic surface active agents.

12. The process of claim 1 in which the reaction medium additionally contains a protective colloid.

13. The process of claim 1 in which the reaction medium additionally contains an alkaline buffering agent.

14. The process of claim 1 in which the balance of the total vinyl acetate monomer (a) together with the balance of the monomer (b) is added incrementally in the second step, wherein the ratio of vinyl acetate monomer to monomer (b) in the first incremental addition is greater than about 4.5 until about 40-60% of the total monomer charge is added, and thereafter, in a second incremental addition, the ratio of vinyl acetate monomer to monomer (b) is less than about 4.5 until the remaining amount of monomers is added to the reactor.

* * * * *